United States Patent [19]

Lindén

[11] Patent Number: 5,697,159
[45] Date of Patent: Dec. 16, 1997

[54] PIVOTED HAND TOOL

[75] Inventor: Erkki Olavi Lindén, Billnäs, Finland

[73] Assignee: Fiskars Consumer Oy Ab, Finland

[21] Appl. No.: 625,294

[22] Filed: Apr. 1, 1996

[30] Foreign Application Priority Data

Nov. 23, 1995 [FI] Finland ............... 955647

[51] Int. Cl.$^6$ ............... B26B 13/26; B26B 13/00
[52] U.S. Cl. ............... 30/250; 30/192; 30/249
[58] Field of Search ............... 30/188, 189, 191, 30/192, 245, 247, 249, 250, 232, 239

[56] References Cited

U.S. PATENT DOCUMENTS

| | | | |
|---|---|---|---|
| 1,395,758 | 11/1921 | Maszcyzk | ............... 30/250 |
| 3,572,192 | 3/1971 | Juras . | |
| 4,073,059 | 2/1978 | Wallace et al. . | |
| 4,696,107 | 9/1987 | Held | ............... 30/249 X |
| 5,339,712 | 8/1994 | Keyvani . | |
| 5,426,857 | 6/1995 | Lindén . | |

FOREIGN PATENT DOCUMENTS

| | | |
|---|---|---|
| 16665 | 8/1934 | Finland . |
| 2 636 557 | 9/1988 | France . |
| 1281969 | 9/1964 | Germany . |
| 416370 | 1/1967 | Switzerland . |
| 1363186 | 5/1972 | United Kingdom . |

OTHER PUBLICATIONS

Photographs of Swiss Felco 12 Pruner (Side Elevational View—Open; Detail View—Open; Side Elevational View—Closed; Detail View—Closed).

*Primary Examiner*—Douglas D. Watts
*Attorney, Agent, or Firm*—Foley & Lardner

[57] ABSTRACT

A hand tool for cutting, such as a pair of pruners, includes a pair of opposed elongated members, each member comprising a jaw at a front end portion thereof, a handle at a rear end portion thereof, and a midportion where the members cross over each other. A pivotable joint unites the midportions for scissor-like movement of the handles and jaws, and a spring biases the handles and jaws to an open position. According to the invention, one of the handles is rotatable. A transmission mechanism is provided to interconvert the rotation force applied to the rotatable handle into a rectilinear force used to draw the handles together.

26 Claims, 5 Drawing Sheets

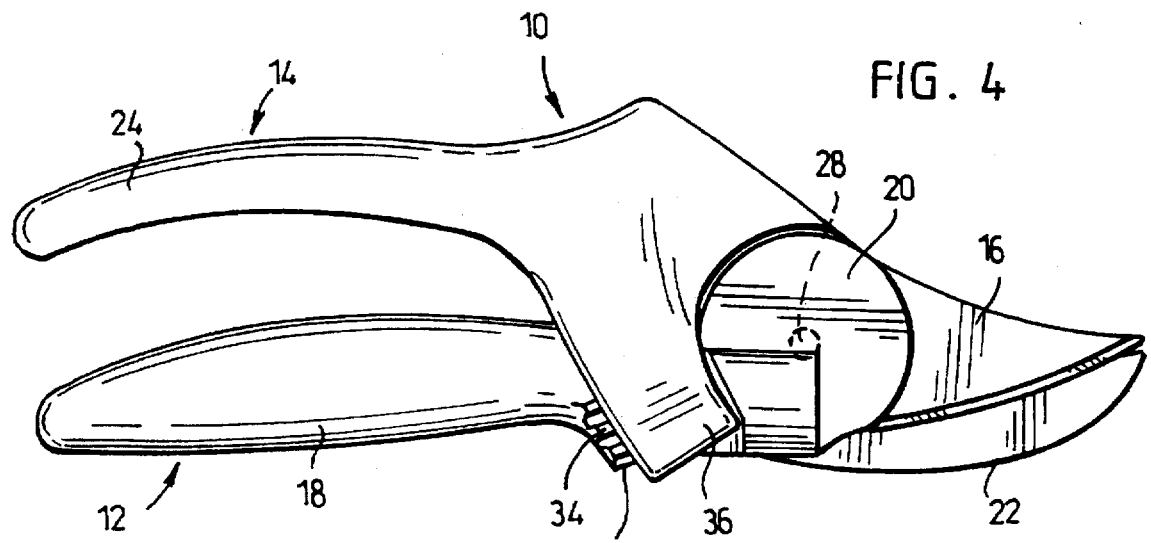
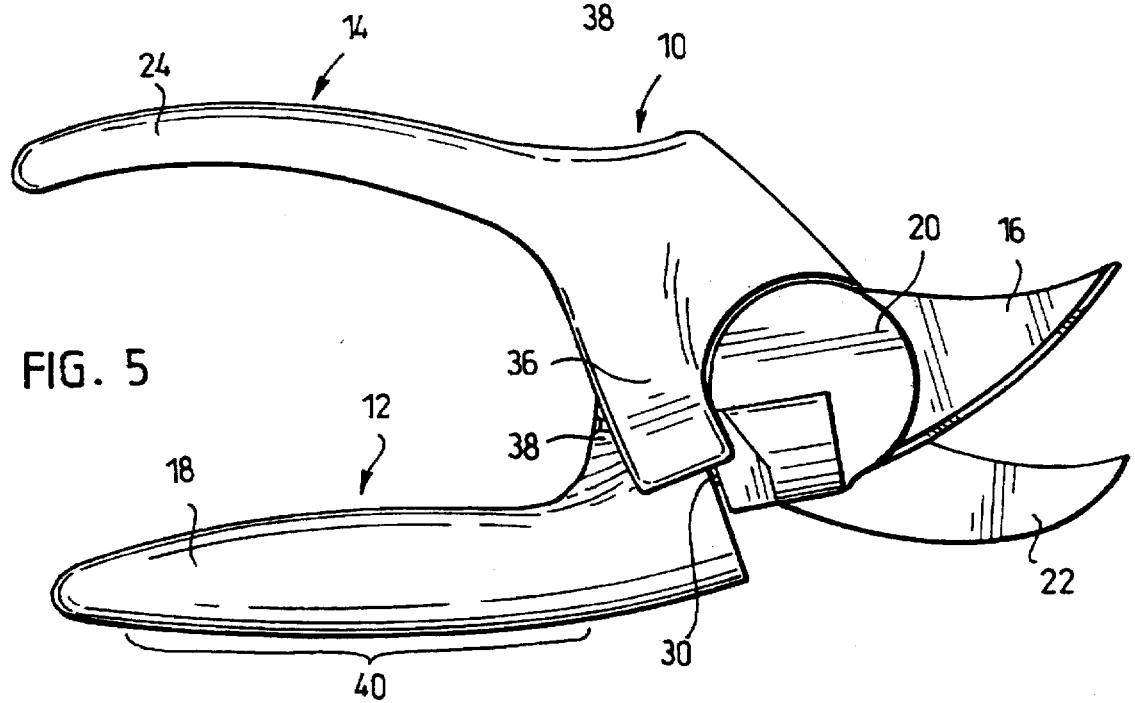
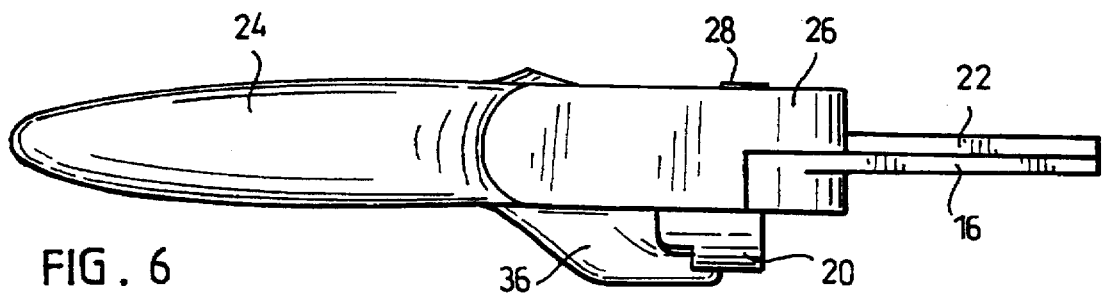

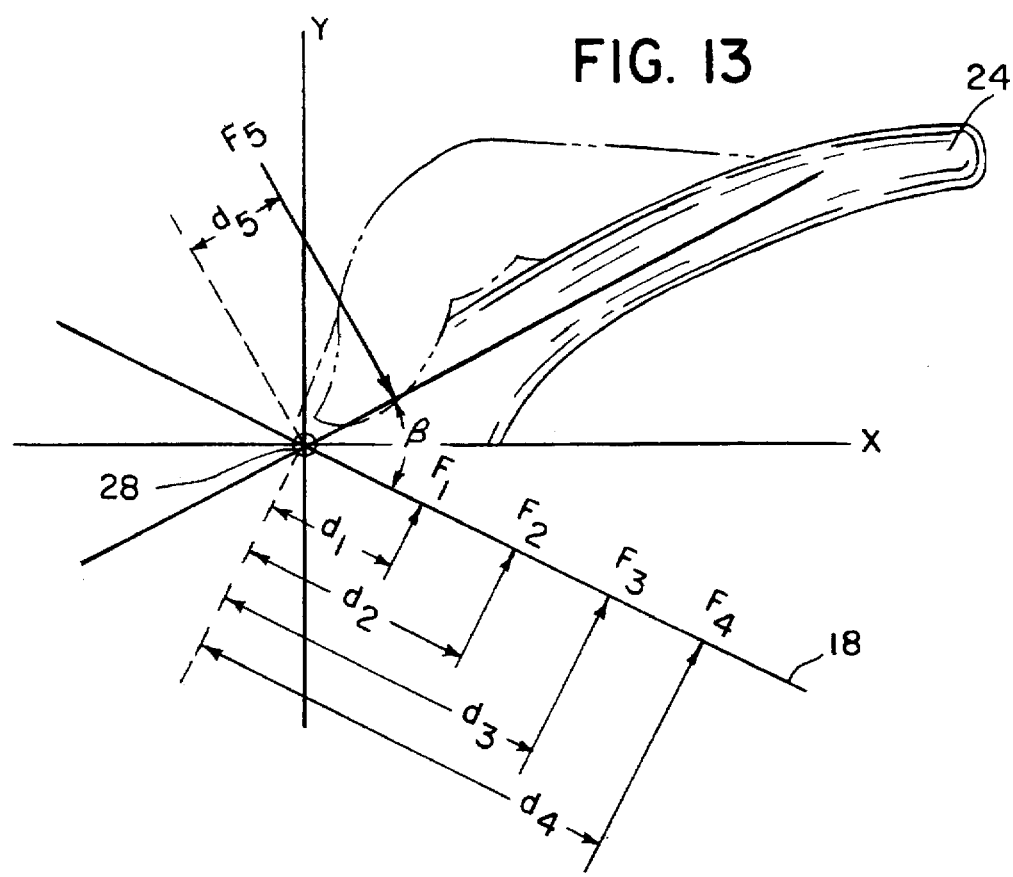
FIG. 13
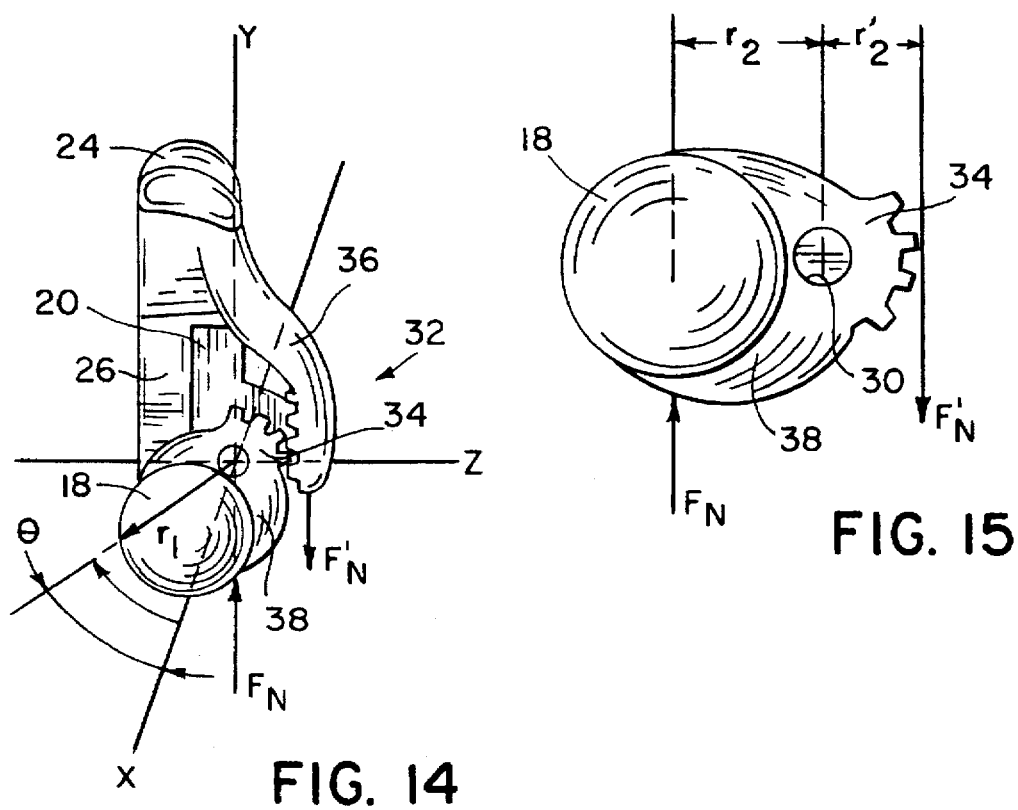
FIG. 14
FIG. 15

PIVOTED HAND TOOL

FIELD OF THE INVENTION

The present invention relates generally to hand-held cutting tools, particularly to pruning snips.

BACKGROUND OF THE INVENTION

Pivoted implements having elongated members disposed for cooperative engagement about a pivotable joint are widely used. In particular, pivoted tools such as pruning snips generally comprise two elongated members, typically made of stamped or forged metal or other suitable material, disposed for cooperative engagement about the pivotable joint. Typically, each member includes a jaw at the front end portion thereof, an opposed tang, and a pair of handles connected to the tangs.

In the case of conventional pivoted hand tools such as scissors, pruners or tongs, the fingers initially apply a force substantially perpendicular to the surface of the lower handle. Then, during the scissor-like movement of the handles, the fingers rotate in a clockwise direction about the lower handle, thereby reducing the force used to draw the handles together and increasing kinetic friction. The kinetic friction resulting from the sliding of the fingers about the handle creates discomfort to the user and reduces the efficiency of the pruner. It is also known that, in cutting tools such as pruners, a relatively strong impact occurs at the end of the cutting movement when the resistance presented by the piece being cut is reduced.

Attempts have been made to address the kinetic friction problem an increase user comfort. For example, in the Swiss pruner Felco 12 a lower handle, against which the fingers of the user are intended to be placed, is rotatable about its longitudinal axis. As a result, the fingers do not slide along the surface of the handle during the cutting movement but the handle rotates with the fingers during the cutting movement. However, since the handle moves very easily, the grip on the handle feels both loose and uncontrolled. Moreover, the fact that the handle is rotatable does not reduce the strong impact at the end of the cutting movement.

Thus, it appears desirable to provide a pivoted tools such as pruning snips or the like which allows a firm and comfortable grip, and in which the force applied by the jaws to the piece being cut is increased in comparison to that of prior art tools.

SUMMARY OF THE INVENTION

The present invention increases the output force of a pair of pruning snips or similar hand cutting tools (i.e., the force applied to the piece being cut), by interconverting a rotation force imparted to one of the handles into a rectilinear force. The force which in conventional tools has been wasted because of the kinetic friction between the fingers and the handle, and which may be quite great when a lot of effort is used, is now added to the force with which the user squeezes the handles closer to each other. In other words, the present invention utilizes the rotating movement imparted to the rotatable handle by the user's fingers to increase the cutting force applied by the jaws to the item being cut. Furthermore, the fact that the rotation of one of the handles draws both handles closer together also improves the user's control of the tool, and reduces the impact at the end of the cutting movement of the tool.

A pivoted hand tool in accordance with the invention comprises a pair of first and second opposed elongated members, each member having a jaw at a front end portion thereof, a handle at a rear portion thereof, and a midportion where the members cross over each other. The handle of the first elongated member is rotatable about a rotation axis. A pivot unites the midportions of the opposed elongated members for scissor-like movement of the handles and the jaws about the pivot. A transmission mechanism interconverts a force applied to the rotatable handle into a rectilinear force drawing the handles closer to each other.

According to one aspect of the invention the transmission mechanism comprises an elongated flexible element and a groove formed in the rotatable handle at a distance from the rotation axis of the handle. Part of the flexible element is received in the groove when the handles are brought together.

According to a preferred embodiment of the present invention, the transmission mechanism includes a rack and pinion arrangement in which a pinion formed on the rotatable handle intermeshes with a rack formed on the other handle of the pivoted tool.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and:

FIG. 4 is a rear elevational view of the pruning snips shown in FIG. 1;

FIG. 5 is a rear elevational view of the pruning snips shown in FIG. 2;

FIG. 6 is a top plan view of the pruning snips of FIG. 4;

FIG. 13 is a diagram of vector forces applied by the user's fingers to the pruning snips of FIG. 2;

FIG. 14 is a side elevational view as in FIG. 10 illustrating the rotation of the lower handle; and FIG. 15 is a diagram of the transmission of forces by the rotatable handle.

DETAILED DESCRIPTION OF A PREFERRED EXEMPLARY EMBODIMENT

Figure 1:
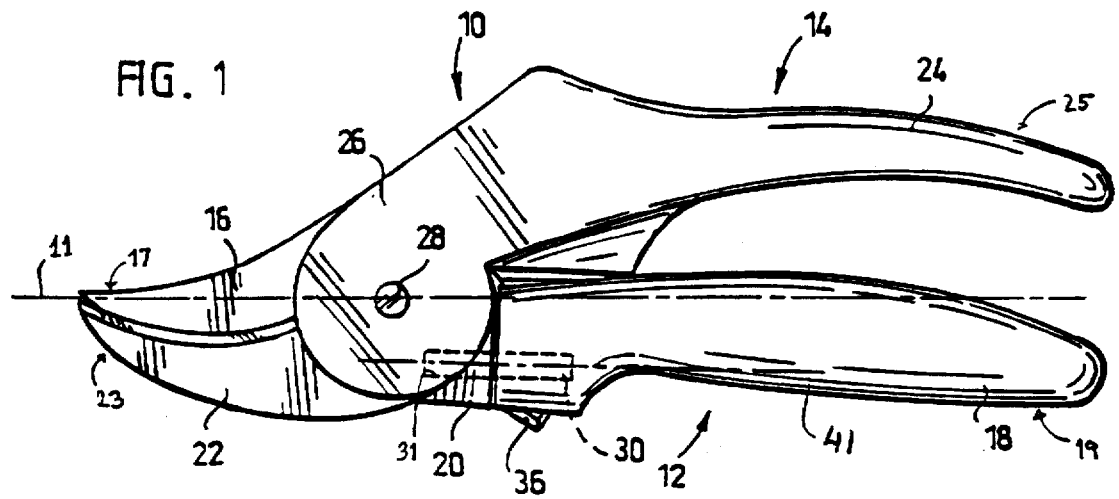
FIG. 1 is a front elevational view of pruning snips in accordance with the invention, shown in the closed position.

The invention relates to pivoted tools having elongated members disposed for cooperative engagement about a pivotable joint wherein a force applied to handles of the tool is transmitted to the jaws engaging a workpiece to be cut.

Referring to the Figures, a pruner 10 according to the invention having a longitudinal axis 11 includes first and second elongated members 12 and 14, respectively, joined for scissor action about a pivot point 28. First elongated member 12 includes a jaw 16 in the form of a cutting blade at a front end portion 17 thereof, a handle 18 at a rear end portion 19, and a midportion 20 intermediate jaw 16 and handle 18. Similarly, second elongated member 14 includes a jaw 22 in the form of a cutting blade at a front end portion 23 thereof, a handle 24 at a rear end portion 25, and a midportion 26 intermediate jaw 22 and handle 24.

Figure 2:
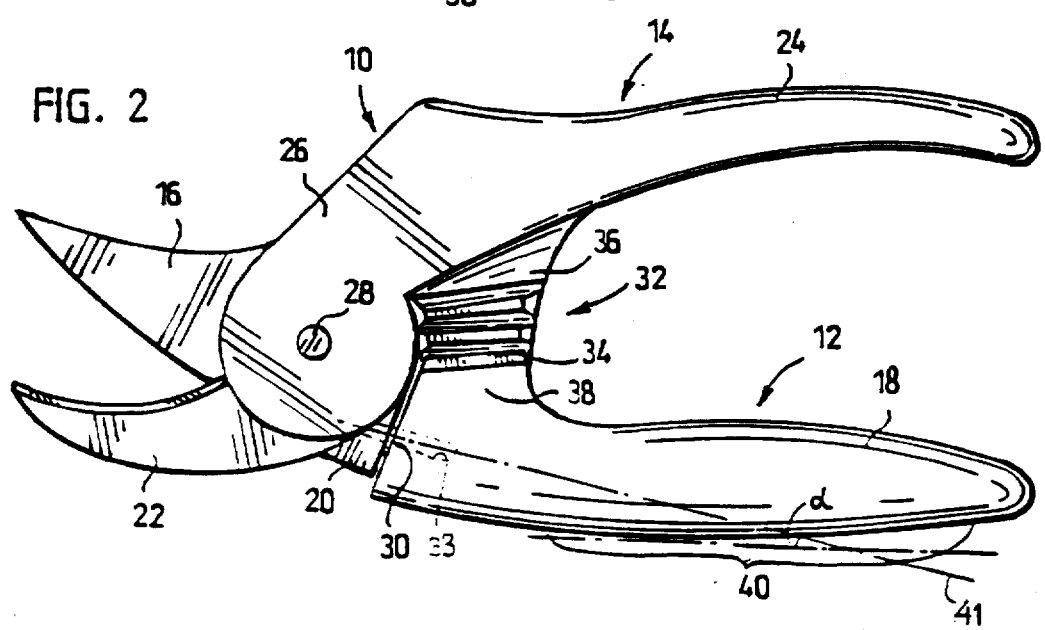
FIG. 2 is a front elevational view of the pruning snips of FIG. 1, shown in the open position.
Figure 3:
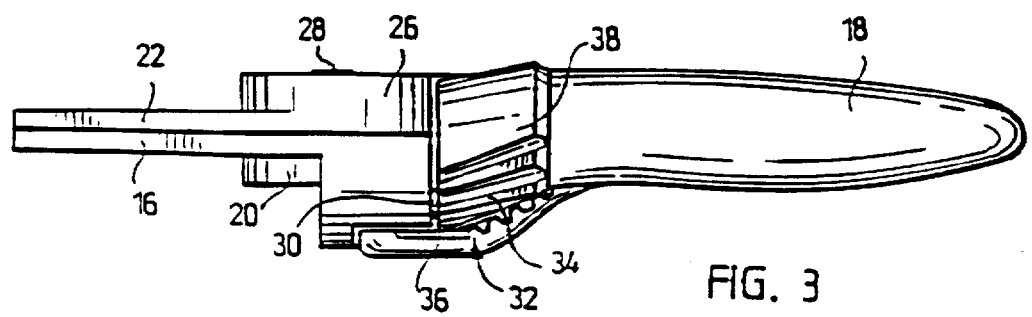
FIG. 3 is a bottom plan view of the pruning snips of FIG. 1.

Referring more particularly to FIG. 2, pruner 10 is preferably provided with a compression spring (not shown) between elongated members 12 and 14 for resiliently biasing handles 18 and 24 to an open position, and a locking mechanism (not shown) for locking pruner 10 in a closed position (FIG. 1). In the alternative, other biasing mechanisms such as a leaf spring secured to one of the handles and having a free end engaging the other handle could be employed.

As with prior art pruners, the user grasps pruner 10 in such a way that the thumb is placed in the forward region of handle 24, and the remaining four fingers are placed on handle 18 which is rotatably mounted about a pivot pin 30 which defines a rotation axis 41. Pin 30 is received in a bore 31 formed in midportion 20 of elongated member 12 and extending in a direction essentially parallel to longitudinal axis 11 when jaws 16, 22 are closed, and in a second bore 33 formed in side projection 38 located in the forward region of handle 18. As more particularly shown in FIG. 5, handle 18 includes a gripping plane 40 which a portion of the user's four fingers will tangentially contact when the user grasps rotatable handle 18. In the open position, gripping plane 40 forms an included angle α with rotation axis 41. Angle α is in the range of 10° to 30°, preferably approximately 20°. Therefore, gripping plane 40 and rotation axis 41 converge at a point away from midportions 20 and 26. The simplest way to create an included angle between gripping plane 40 and rotation axis 41 is to provide the end of rotatable handle 18 in which pin 30 is received with side projection 38. As a result, rotatable handle 18 operates as a crank.

Figure 7:
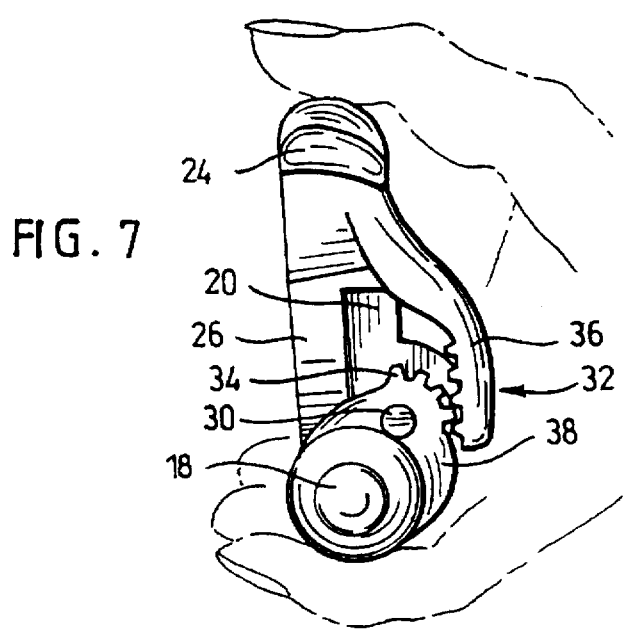
FIG. 7 is a side elevational view of the pruning snips of FIG. 2, shown from the free end of the handles.
Figure 8:
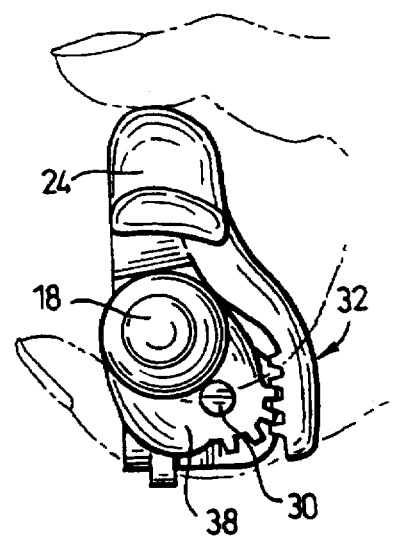
FIG. 8 is a side elevational view of the pruning snips of FIG. 1, shown from the free end of the handles.
Figure 9:
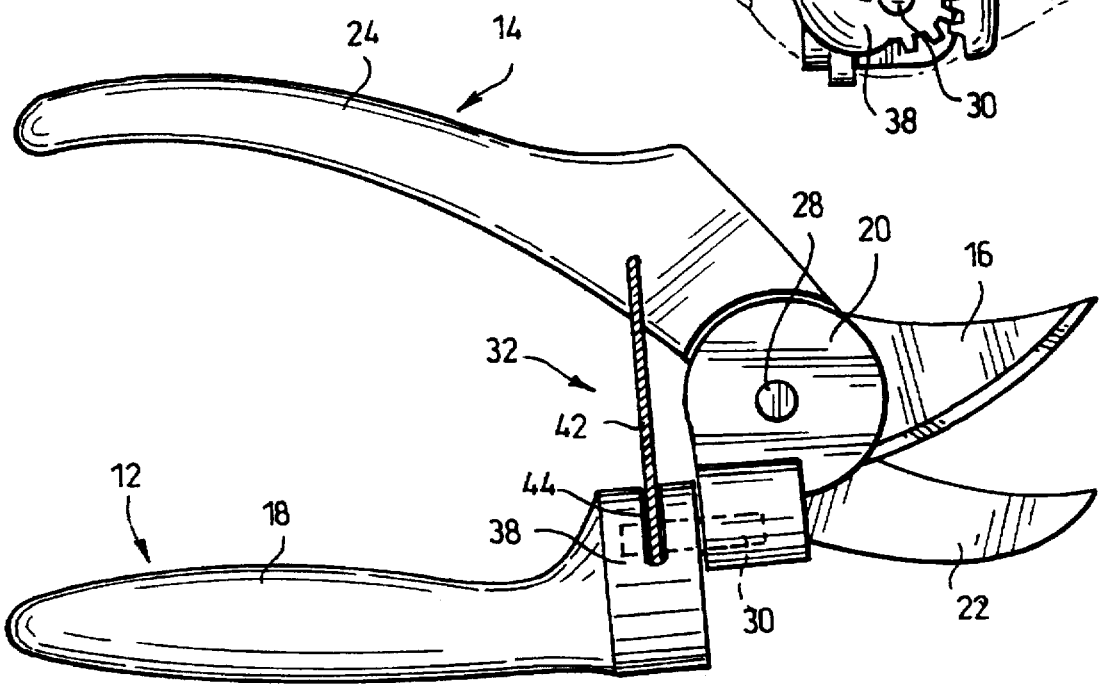
FIG. 9 is a rear elevational view of another embodiment of the pruning snips according to the invention.

Referring now to FIGS. 7–9, pruner 10 comprises a transmission mechanism 32 which includes a pinion sector 34 connected to first handle 18 and meshing with a rack 36 connected to second handle 24. Pinion sector 34 is preferably integrally formed with first handle 18 and rack 36 is preferably integrally formed with second handle 24. Pinion sector 34 and rack 36 each includes a plurality of teeth. Rack 36 is inwardly curved toward pinion sector 34, thereby allowing the teeth of rack 36 to continuously engage the teeth of pinion sector 34 when a force is applied to close handles 18 and 24. As will be discussed in greater detail below, this hypoid-like arrangement of pinion sector 34 and rack 36 interconverts the rotation force applied by the user's four fingers to first handle 18 into a rectilinear force drawing handles 18 and 24 closer to each other.

As more particularly illustrated in FIGS. 2, 7 and 8, pinion sector 34 is preferably formed on side projection 38. When pruner 10 is in the open position as shown in FIGS. 2 and 7, side projection 38 faces substantially toward handle 24. When pruner 10 is in a closed position (FIGS. 1 and 8), side projection 38 faces substantially away from handle 24.

Turning now to a second embodiment of the present invention, as illustrated in FIG. 9, pruner 10 includes a transmission mechanism 32 having an elongated flexible wire 42 secured to handle 24. Wire 42 joins first handle 18 to second handle 24. A portion of wire 42 is received in a groove 44 formed in first handle 18 proximate midportion 20.

When a user applies a force to second handle 24 with the thumb and applies a rotation force to first handle 18 with the remaining four fingers, first handle 18 rotates about pivot pin 30. As first handle 18 is rotated, a greater portion of wire 42 is received in groove 44, thereby drawing handles 18 and 24 together. Wire 42 thereby interconverts the rotation force applied to handle 18 into a rectilinear force drawing handles 18 and 24 together. In the same way as in the preferred embodiment of the present invention, handle 18 of FIG. 9 is shaped as a crank, which further increases the force applied to the piece being cut.

Interconversion of the rotation force applied to handle 18 into a rectilinear force drawing the handles closer together may also be accomplished by means of frictional engagement as opposed to gear-type or wire constructions. For example, transmission mechanism 32 may include two oppositely facing surfaces formed on handles 18 and 24. The surfaces would have appropriate coefficients of friction so that rotation of handle 18 would effectively engage handle 24 to draw the two handles closer together.

We will now analyze more conceptually the benefits afforded by the present invention, whether configured as a rack and pinion arrangement, as a wire joining the two handles, or as frictionally engaging surfaces. As we will demonstrate below, in both embodiments of this invention, the interconversion of a rotation force into a rectilinear force increases the output force of pruner 10, thereby increasing the mechanical advantage of pruner 10. Typically, the mechanical advantage of a tool is defined by:

$$MA = \frac{F_{output}}{F_{input}}$$

wherein $F_{output}$ is the total force applied to the workpiece to be cut and $F_{input}$ is a total force applied by the user to pruner 10.

Expressions of mechanical advantage are powerful design tools because they allow the optimal redesign of a tool for improved mechanical advantage. Practical considerations, however, such as the maximum size of the tool will usually limit the extent of acceptable changes to antoriginal design. The transmission mechanism 32 of the present invention maximizes the mechanical advantage of tool 10 while maintaining the practicality of the tool.

Figure 10:
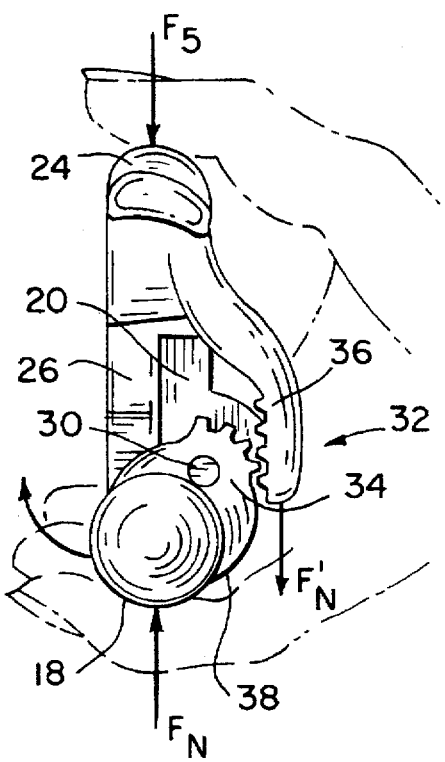
FIG. 10 is a side elevational view as in FIG. 7 showing the various vector forces applied to the pruning snips.
Figures 11, 12:
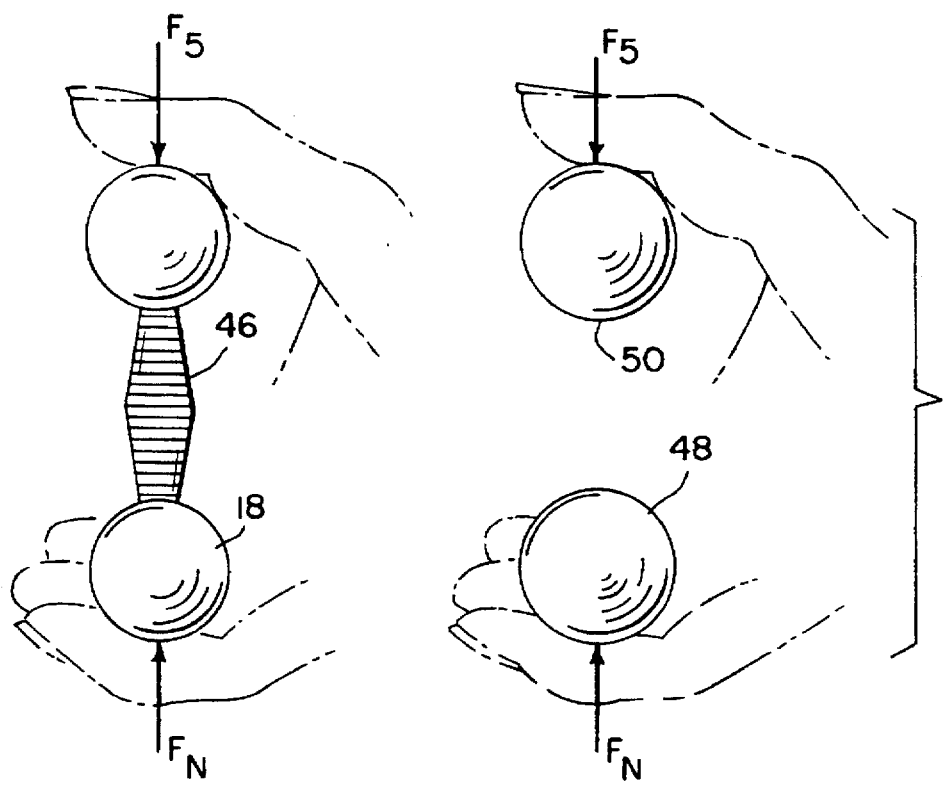
FIG. 11 is a side elevational view of the Felco 12 pruner, viewed from the free end of the handles in the open position, and showing the vector forces applied to the pruner.
FIG. 12 is a side elevational view of a conventional pruning snips with non-rotatable handles, viewed from the free end of the handles in the open position, and showing the vector forces applied.

Referring to FIGS. 10–12, a user applies force $F_N$ to first handle 18 and $F_S$ to second handle 24 which are then converted to an output force in the form of the work performed to cut a workpiece with jaws 16 and 22. FIG. 10 depicts the present invention wherein force $F_N$ applied to first handle 18 is interconverted into a force $F_{N'}$ which represents the useful component of force $F_N$. The rotation of first handle 18 and engagement of pinion sector 34 with rack 36 results in the majority of force $F_N$ being used to draw handles 18 and 24 together. Conversely, in prior art pruners, as depicted in FIGS. 11 and 12, there is no interconversion of the rotation force from the fingers of the user. Accordingly, in prior art pruners $F_{N'}$ is equal to zero.

More particularly, FIG. 11 illustrates the Felco 12 pruner in which handle 18 is rotatable. The only useful purpose of rotatable handle 18 of the Felco 12 pruner is to dissipate the kinetic friction typically caused by the rotation of the user's fingers as the cut is being made. While rotation of handle 18 increases user comfort, it also increases the instability of the pruner in the user's hand, and most likely reduces the mechanical advantage.

FIG. 12 illustrates a conventional pair of pruners including a first non-rotatable handle 48 and a second non-rotatable handle 50. As a user applies force $F_N$ to first handle 48, the four fingers slip and no longer apply a substantially perpendicular force $F_N$ to first handle 48. A component of force $F_N$ also dissipates into kinetic friction forces in first handle 48.

In order to understand the interconversion of the rotation force into a rectilinear force in the present invention, it is helpful to analyze the work performed by pruner 10. Referring to FIGS. 13–15, $\beta$ designates the included angle formed by first handle 18 with second handle 24. The thumb of the user applies force $F_5$ to second handle 24 at a distance $d_5$ from pivotable joint 28; the four remaining fingers apply forces $F_1$, $F_2$, $F_3$, and $F_4$ to first handle 18 at distances $d_1$, $d_2$, $d_3$, and $d_4$, respectively, from pivotable joint 28. First handle 18 rotates through an angle $\Theta$ (shown in FIG. 14) with radius $r_1$, and due to the circular motion of first handle 18, forces $F_1$, $F_2$, $F_3$, and $F_4$ remain substantially perpendicular to first handle 18.

The work associated with the rotation of first handle 18 about pivot pin 30 is a function of the work performed in the xy-plane and the work performed in the yz-plane. The following equation is therefore representative of the total work performed by each finger of the user:

$$W_n(F_m, d_m, r_1, \theta\beta) = W_{(xy)_n}(F_m, d_m, \beta) + W_{(yz)_n}(F_m, r_1, \theta)$$

wherein $F_n$ is a force applied by a finger n to first handle 18, $d_n$ is the distance between pivotable joint 28 and force $F_n$, $\beta$ is an included angle between first handle 18 and second handle 24, $\Theta$ is the angle of rotation of first handle 18 and $r_1$ is a radius of a circle formed by the rotation of first handle 18.

The work performed in the xy-plane is calculated by multiplying the force by the distance travelled by first handle 18. If the circumference of a circle is $2\pi d_n$, the arc representing the distance travelled by first handle 18 through included angle $\beta$ is defined by:

$$W_{(xy)_n} = F_n 2\pi d_n \frac{\beta}{360} = F_n \beta d_n \frac{\pi}{180}$$

Similarly, the work performed in the yz-plane is defined by:

$$W_{(yz)_n} = F_n 2\pi r_1 \frac{\theta}{360} = F_n \theta r_1 \frac{\pi}{180}$$

Therefore, the total work associated with each finger 1–4 in the xy-plane and yz-plane is defined by:

$$W_n = F_n \beta d_n \frac{\pi}{180} + F_n \theta r_1 \frac{\pi}{180} = \frac{F_n \pi}{180} [\beta d_n + \theta r_1]$$

In conventional pruners as depicted in FIG. 12, there is no $W_{yz}$ component ($W_{yz}=0$) because there is no rotation of handle 48 in the yz-plane. Additionally, as discussed above, the slipping of the four fingers about handle 48 only results in kinetic friction, i.e., a loss of usable work. Similarly, the rotatable handle of the Felco 12 pruner illustrated in FIG. 11 merely dissipates the kinetic friction and does not provide a useful force component for drawing handles 18 and 24 together.

The present invention, however, capitalizes on the rotation of handle 18 by interconverting $F_N$ into a rectilinear force by means of transmission mechanism 32. Referring again to FIGS. 13–15, pruner 10 increases its output force ($F_{output}$), thereby increasing the mechanical advantage of the tool, by interconverting force $F_N$ into an internal force $F'_N$. Force $F'_N$ is a direct translation of force $F_N$ and is not lost in rotation of first handle 18. The rectilinear force $F'_N$ is defined as follows:

Since
$$F_N r_2 = F'_N r'_2$$

Therefore,
$$F'_N = \frac{F_N r_2}{r'_2}$$

wherein $r_2$ is the distance between the center of first handle 18 and rotation axis 41, $r'_2$ is the distance between rotation axis 41 and the region where pinion 34 intermeshed with rack 36, and $F_N$ is the force applied by the user. The inventor has noted that transmission mechanism 32 increases the work performed by pruner 10 (i.e., as represented by force multiplied by distance travelled) by approximately 30% to 40% over prior art pruners.

The pruner illustrated in FIGS. 1 to 15 operates as follows. When a branch, for example, is to be cut, the user grabs handles 18 and 24 of open pruner 10 shown in FIG. 2 in such a manner that the thumb is placed on top of handle 24 and the fingertips of the four remaining fingers grasp first handle 18 on gripping plane 40. The positioning of the fingers is further illustrated in FIG. 7. When handles 18 and 24 are drawn together to cut the branch, handle 18 rotates about pivot pin 30 causing pinion sector 34 to engage rack 36. As described above, the rotation force exerted on handle 18 through the four fingers ($F_N$) is interconverted into the internal rectilinear force ($F'_N$) through the use of transmission mechanism 32.

The cutting force of pruner 10 is further enhanced by gripping plane 40 forming included angle $\alpha$ with rotation axis 41 when pruner 10 is in an open position (FIG. 2), thereby allowing each of the four fingers to traverse an approximately equal distance during the cutting movement. In the known hand tools of this type where the handles are positioned at an angle with respect to each other, the strongest fingers are utilized only partly, as they move a distance which is shorter than that travelled by the weaker fingers.

Additionally, because handles 18 and 24 are interconnected by means of transmission mechanism 32, the jarring movement typical of prior art pruners that occurs at the end of the cut is also dampened in pruner 10.

It is understood that the above description is of exemplary and preferred embodiments of the present invention, and that the invention is not limited to the specific forms described. For example, tools in accordance with the invention could also comprise a pair of scissors. Moreover, the rotation of handle 18 could be provided by means other than pin 30. Additionally, transmission mechanism 32 could be constructed in other ways, nor necessarily formed integrally with the handles. Also, the interconversion of a rotation force into a rectilinear force could be effected by means other than those described herein. These and other substitutions, modifications, changes and omissions may be made in the design and arrangement of the element disclosed herein without departing from the scope of the appended claims.

I claim:

1. A pivoted hand tool having a longitudinal axis, the tool comprising:
   a pair of first and second opposed elongated members, each member having a jaw at a front end portion thereof, a handle at a rear portion thereof, and a midportion where the members cross over each other;
   a pivot uniting the midportions of the elongated members for scissor-like movement of the handles and the jaws about the pivot, the handle of the first elongated member being rotatable about a rotation axis substantially parallel to the longitudinal axis when the jaws are closed; and
   a transmission means for interconverting a rotation force applied to the first handle into a rectilinear force drawing the handles closer to each other.

2. A hand tool according to claim 1, wherein the first handle rotates clockwise about the rotation axis.

3. A hand tool according to claim 1, wherein the first handle is rotatable about a pivot pin received in a bore in the midportion of the first elongated member.

4. A hand tool according to claim 1, wherein the transmission means includes a pinion sector connected to the first handle and meshing with a rack connected to the second handle.

5. A hand tool according to claim 4, wherein the pinion sector is integrally formed with the first handle.

6. A hand tool according to claim 4, wherein the rack is integrally formed with the second handle.

7. A hand tool according to claim 4, wherein the rack is inwardly curved for continuous engagement with the pinion sector.

8. A hand tool according to claim 1, wherein the transmission means comprises an elongated flexible wire joining the first handle to the second handle and a groove formed in the first handle proximate its midportion, a portion of the wire being received in the groove as the first handle is rotated, thereby drawing the handles together.

9. A hand tool according to claim 1, wherein the transmission means comprises a pair of first and second oppositely facing surfaces, the first surface being connected to the first handle and the second surface being connected to the second handle, the first and second surfaces coming into frictional engagement upon rotation of the first handle thereby drawing the handles closer together.

10. A hand tool according to claim 1, wherein the rotatable handle comprises a gripping plane tangential to a portion of a user's fingers when the user grasps the rotatable handle.

11. A hand tool according to claim 10, wherein, when the jaws are open, the rotation axis and the gripping plane converge at a point away from the pivot.

12. A hand tool according to claim 11, wherein the rotation axis intersects the gripping plane at an included angle α when the jaws are open.

13. A hand tool according to claim 12, wherein α is in the range of 10° to 30°.

14. A hand tool according to claim 1, wherein the transmission means limits relative movement of the handles at the end of a cutting motion.

15. A hand tool according to claim 5, wherein the rack and pinion sector limits relative movement of the handles at the end of the cutting motion.

16. A hand tool according to claim 1, wherein the rotatable handle is shaped as a crank.

17. A hand tool according to claim 1, wherein the tool is a pruning snips.

18. A pivoted hand tool having a longitudinal axis, the tool comprising:
   a pair of first and second opposed elongated members, each member having a jaw at a front end portion thereof, a handle at a rear portion thereof, and a midportion where the members cross over each other;
   a pivot uniting the midportions of the opposed elongated members for scissor-like movement of the handles and the jaws about the pivot; and
   wherein the handle of the first elongated member has a center point and is rotatable about a rotation axis substantially parallel to the longitudinal axis when the jaws are closed, the rotation axis being offset from the center point, the handle of the first member being movably connected to a region of the second handle so that a rotation force applied to the first handle produces a rectilinear force drawing the handles closer to each other.

19. A hand tool according to claim 18, wherein the handle of the first elongated member is configured so that the rotation axis being offset from the center point causes the rectilinear force produced upon rotation of the handle of the first elongated member to be equal to:

$$F_N' = \frac{F_N r_2}{r'_2}$$

wherein $r_2$ is the distance between the center point and the rotation axis, $r'_2$ is the distance between the rotation axis and the region, and $F_N$ is the force applied by the user.

20. A hand tool according to claim 18, wherein the handle of the first elongated member is configured so that the rotation axis being offset from the center point causes a work produced by rotation of the handle of the first elongated member about the rotation axis and usable to cut a workpiece received within the jaws to be characterized by:

$$W_n = \frac{F_n \pi}{180} [\beta d_n + \theta r_1]$$

wherein $F_n$ is a force applied by a user's finger n to the rotatable handle, $d_n$ is the distance between the pivot and finger n, $\beta$ is an included angle between the rotatable handle and the second handle, $\Theta$ is an angle of rotation of the rotatable handle about the rotation axis, and $r_1$ is a radius of a circle formed by the rotation of the rotatable handle.

21. A pivoted hand tool, comprising
   first and a second elongated members each being provided with a jaw at a front end, a handle at a rear end, and a midportion where the members intersect;
   a pivot which connects the midportions of the members to each other in order to allow scissor-like movement of the jaws and handles around the pivot, wherein the handle of the first elongated member, against which the user's fingertips are intended to be placed, is rotatable around a pivot pin in the first elongated member, the pin extending in a direction substantially perpendicular to the pivot; and
   a transmission mechanism provided on the rotatable handle and the second elongated member for converting the rotation force of the rotatable handle into a force for drawing the handles closer to each other.

22. A hand tool according to claim 21, wherein the transmission mechanism comprises a pinion sector mounted on the rotatable handle, and a rack mounted on the second elongated member, the rack engaging the pinion sector.

23. A hand tool according to claim 21, wherein the transmission mechanism comprises an elongated flexible element and a groove formed in the first handle proximate its midportion, a portion of the element being received in the groove as the first handle is rotated, thereby drawing the handles together.

24. A hand tool according to claim 23, wherein the elongated flexible element is a wire.

25. A hand tool according to claim 21, wherein the rotatable handle comprises a gripping plane tangential to a portion of a user's fingers when the user grasps the rotatable handle.

26. A hand tool according to claim 25, wherein, when the jaws are open, the rotation axis and the gripping plane converge at a point away from the midportions.

* * * * *